United States Patent Office 3,578,672
Patented May 11, 1971

3,578,672
2-PROPARGYLAMINO-5-PHENYL-2-OXAZOLIN-4-ONE AND DERIVATIVES
Cheuk Man Lee and Bruce Wayne Horrom, Waukegan, Ill., assignors to Abbott Laboratories, North Chicago, Ill.
No Drawing. Filed Nov. 3, 1969, Ser. No. 873,688
Int. Cl. C07d 85/40
U.S. Cl. 260—307    12 Claims

ABSTRACT OF THE DISCLOSURE 2-propargylamino-5-phenyl-2-oxazolin-4-one and derivatives thereof were found to be effective anti-depressants when administered in oral dosages of 0.5–20 mg./kg. to warm-blooded animals. The new compounds are prepared by condensing 2-amino-5-phenyl-2-oxazolin-4-one with propargylamine or the corresponding N- and/or 1-mono- or disubstituted alkyl derivatives thereof in the presence or absence of an inert reaction medium.

---

This invention relates to 2-propargylamino-5-phenyl-2-oxazolin-4-one derivatives which may carry lower alkyl substituents on the α-carbon of the amino nitrogen, alkyl or phenyl substituents on the 5-position of the oxazoline ring or simple halogen, alkyl or alkoxy substituents in the phenyl ring. The new compounds are represented by the formula

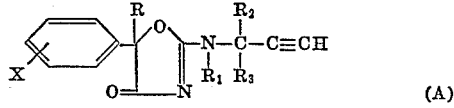

(A)

wherein X is hydrogen, fluorine, chlorine, lower alkyl, trifluoromethyl or one or more lower alkoxy groups, $R_1$, $R_2$ and $R_3$ are hydrogen or lower alkyl and R is hydrogen, methyl or phenyl.

The compounds of Formula A are excellent anti-depressants as established by the modified Dopa-test (described by Everett in Excerptia Intl. Congress Series No. 122, page 164–7) in mice. They are administered orally to animals at doses of 1–100 mg./kg. and to humans at 0.2–10 mg./kg./day. In most animals, the anti-depressant effect lasts for 24 hours or more. Some of the new compounds also are useful as learning enhancers at levels significantly below the above, e.g., the $ED_{50}$ is 1–20 mg./kg. in animals.

The new compounds are generally made by condensation of the 2-amino-5-phenyl-2-oxazolin-4-one carrying the appropriate X- and R-substituents. When $R_1$ is hydrogen, the reaction is preferably performed in the presence of an inert relatively low boiling solvent; when $R_1$ is alkyl, the condensation is best carried out in the presence of an inert high, boiling solvent or without solvent at a temperature of between 100° and 150° C. In either case, the reaction is carried out for a period of between 5 and 100 hours. When a solvent is used, the above reference to "inert" means to express that such a solvent does not react with either reactant or the resulting end product; a "relatively" low boiling solvent refers to a liquid boiling below 100° C., i.e., one which can be removed easily after completion of the condensation reaction. Excellent results are obtained by using alcohols such as methanol, ethanol or propanol; however, other media such as 2-methoxyethanol, dimethylformamide, dioxane, etc., may be used.

When $R_2$ and $R_3$ in the above formula are each an alkyl group, a different procedure is used to synthesize these derivatives; the proper α,α-disubstituted propargylurea is reacted with the appropriate X- and R-substituted α-chloro-α-phenylacetyl chloride followed by cyclizing the intermediate in the presence of sodium alcoholate to form the oxazoline ring. Each of these reactions is carried out in the presence of a solvent inert to the particular reactants involved, e.g., dioxane, dimethylformamide, benzene, alcohols such as methanol, propanol, etc., preferably ethanol is used for the cyclization step; benzene is preferred for the condensation reaction with the urea derivative.

In order to illustrate the procedure leading to the new compounds, reference is made to the following examples which however, are not meant to limit this invention in any respect.

EXAMPLES 1–12

A mixture of 17.6 g. (0.1 mole) of 2-amino-5-phenyl-2-oxazolin-4-one, 11.0 g. (0.2 mole) of propargylamine and 500 ml. of ethanol was refluxed with stirring until no more ammonia evolved (about 70 hours). The solution was then concentrated in vacuo and the product was filtered and subsequently recrystallized from ethanol. The pure 2-propargylamino-5-phenyl-2-oxazolin-4-one was obtained in a yield of 10.7 g. (50% of theory); it melts at 166–67° C. The oral $LD_{50}$ in mice is 175 mg./kg. the intraperitoneal $LD_{50}$ is 150 mg./kg.

By replacing the above 2-amino-5-phenyl-2-oxazolin-4-one in this procedure by certain analogs carrying an additional substituent in the 5-position or a substituent in the phenyl ring, or replacing propargylamine with analogs thereof, the compounds of structure (A) listed in the table below were prepared; all $R_1$ and $R_3$ substituents are hydrogen.

| Example | X | R | $R_2$ | M.P., °C. | Oral toxicity $LD_{50}$ (mice), mg./kg. |
|---|---|---|---|---|---|
| 2 | 4-Cl | H | H | 189–182 | 400 |
| 3 | 2-F | H | H | 181–182 | 400 |
| 4 | 3-CF$_3$ [a] | H | H | 189–190 | >1,000 |
| 5 | 2-CH$_3$ [b] | H | H | 134–136 | 250 |
| 6 | 4-CH(CH$_3$)$_2$ [c] | H | H | 117–118 | >1,000 |
| 7 | 4-OCH$_3$ | H | H | 161–162 | >1,000 |
| 8 | 4-OC$_3$H$_{11}$(n) [d] | H | H | 139–141 | >1,000 |
| 9 | 3,4,5-(OCH$_3$)$_3$ [e] | H | H | 176–177 | >1,000 |
| 10 | H | CH$_3$ | H | 156–157 | 400 |
| 11 | H | C$_6$H$_5$ | H | 115–117 | 400 |
| 12 | H | H | CH$_3$ | 163–164 | 300 |

NOTE.—The intermediates for the above compounds are all well known except for those marked for the following footnotes which show the melting points of the starting materials: [a] 227–28° C.; [b] 212–22° C.; [c] 231–32° C.; [d] 238–40° C.; [e] 222–25° C.

EXAMPLE 13

A mixture of 17.6 g. of 1-amino-5-phenyl-2-oxazolin-4-one and 41.5 g. of N-methyl-1-methyl-2-propynylamine was refluxed for 28 hours. The excess amine was then removed by distillation under reduced pressure and the crude residue was repeatedly recrystallized from aqueous ethanol to yield the pure 2-[N-methyl-N-(1-methyl-2-propynyl)amino] - 5 - phenyl-2-oxazolin-4-one, melting at 152–3° C. The oral $LD_{50}$ in mice is 250 mg./kg.; the intraperitoneal $LD_{50}$ is 175 mg./kg.

EXAMPLE 14

(a) An aqueous solution of 8.1 g. of potassium cyanate was added to a solution of 11.9 g. of 3-amino-3-methylbutyne hydrochloride in a minimum amount of water. The mixture was stirred for 3 hours and the obtained (1,1-dimethyl-2-propynyl)urea was filtered; M.P. 148–9° C.

In a similar fashion, (1-methyl-1-propyl-2-propynyl)-urea was prepared from the corresponding intermediate; it is an oil.

(b) A solution of 18.9 g. of α-chlorphenylacetyl chloride in 50 ml. of dry benzene was added dropwise to a stirred suspension of 25.2 g. of (1,1-dimethyl-2-propynyl)urea in 150 ml. of dry benzene. The mixture was stirred at room temperature for 1 hour and then heated under reflux for 4 hours. The hot solution was decanted and then evaporated in vacuo. The residue was triturated with water and recrystallized from ethanol to yield 1-(α-chlorophenylacetyl) - 3 - (1,1-dimethyl-2-propynyl)urea melting at 105–7° C.

(c) A suspension 5.57 g. of 1-(α-chlorphenylacetyl)-3-(1,1-dimethyl-2-propynyl)urea in 35 ml. of ethanol was added to a stirred solution of 0.46 g. of sodium in 25 ml. ethanol. The mixture was refluxed for 2 hours and allowed to stand overnight at room temperature. The solid was filtered and washed with ethanol. The combined filtrate was evaporated in vacuo and the residue was triturated with water, refrigerated, and recrystallized from ethanol to yield 2-[(1,1-dimethyl-2-propynyl)amino]-5-phenyl-2-oxazolin-4-one melting at 165-6° C.

The corresponding compounds carrying (I) methyl and ethyl or (II) methyl and propyl in the 1-position melt at 128–31° C. and 145–48° C. respectively. The corresponding oral $LD_{50}$ values in mice are 750 mg./kg. and >1000 mg./kg. for the two compounds.

EXAMPLE 15

The compound of Example 1 was administered to mice to be tested as an anti-depressant in the above mentioned modified Dopa-test, using a rating scale of 3. The following table shows the effects at various dose levels and at different time intervals following administration of this compound:

| Dose, mg./kg.: | Hours | | |
|---|---|---|---|
| | 4 | 8 | 24 |
| 1.25 | 1 | 1 | 1 |
| 2.5 | 2 | 2 | 2 |
| 5 | 2 | 2 | 2 |
| 10 | 3 | 2 | 2 |
| 20 | 3 | 3 | 3 |
| 50 | 3 | 3 | 3 |
| 100 | 3 | 3 | 3 |

EXAMPLE 16

In analogy to Example 15, other compounds of Formula A were tested at various dose levels but only rated by activity after four hours. The following table shows the results obtained.

| Compound of Example No. | mg./kg. | | |
|---|---|---|---|
| | 25 | 50 | 100 |
| 2 | .2 | | 2 |
| 3 | 1 | 2 | 2 |
| 4 | 1 | | 1 |
| 5 | 1 | | 2 |
| 6 | 1 | | 1 |
| 7 | 2 | | 3 |
| 8 | 1 | | 1 |
| 9 | 2 | | 2 |
| 10 | 1 | | 1 |
| 11 | 1 | | 1 |
| 12 | 1 | | 1 |
| 13 | 1 | 2 | 2 |
| 14 | 1 | | 2 |
| 14-I | 2 | | 2 |
| 14-II | 1 | | 1 |

EXAMPLE 17

The compound described in Example 1 was also tested in other animals for its stimulant activity. Orally, the $ED_{50}$ for mice, rats, dogs, cats and monkeys was found to be 5–10 mg./kg.; the intravenous $ED_{50}$ for rabbits was found to be 1–10 mg./kg.

The same compound given orally to mice showed n $ED_{50}$ of 5 mg./kg. at 8 and 24 hours for its anti-depressant activity; the $ED_{50}$ for monkeys in the deserpidine antagonism test was 10 mg./kg.

In rats, the above compound shows significantly enhanced test results in various performance tests such as the "jump-out" test and the Sidman avoidance test; it also reduced errors made by the rats subjected to the maze test.

As seen from the above examples, the new compounds are highly effective anti-depressants; they can also be used as stimulants, as established by subjective observation of animals under the effect of these compounds; the test animals show moderate to marked increases in activity.

The new compound can easily be administered orally or by injection. For the latter, solutions or suspensions may be prepared by slurrying 1–10% of the compound in water containing 0.1–2.0% of carboxymethylcellulose; suspensions may also be prepared using 0.05–0.5% tragacanth solutions. For oral administration, tablets, pills and capsules are easily prepared since the new compounds are solids of excellent stability to storage, moisture and light. Tablets are best prepared to contain between 5 and 25 mg. of the atcive compound together with the usual tableting adjuvants, e.g., coloring agents, flavoring agents, diluents, lubricatns, carriers and, if desired, dispersing agents or release retardants. The new compounds may also be combined with other active compounds particularly with tranquilizers.

What we claim is:

1. A compound of the formula

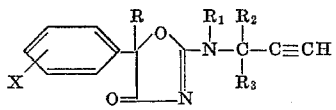

wherein X is hydrogen, fluorine, chlorine, trifluoromethyl, lower-alkyl, or one or more lower-alkoxy groups, R is hydrogen, methyl or phenyl, and $R_1$, $R_2$ and $R_3$ each individually taken are hydrogen or lower alkyl.

2. The compound of claim 1 wherein X, $R_1$, $R_2$, $R_3$ and R each are hydrogen.

3. The compound of claim 1 wherein X is a fluorine atom in the 2-position and R, $R_1$, $R_2$ and $R_3$ each are hydrogen.

4. The compound of claim 1 wherein X is methoxy group in the 4-position and R, $R_1$, $R_2$ and $R_3$ each are hydrogen.

5. The compound of claim 1 wherein X is hydrogen, $R_1$ and $R_2$ each are methyl and R and $R_3$ each are hydrogen.

6. The compound of claim 1 wherein X is a chlorine atom in the 4-position and R, $R_1$, $R_2$ and $R_3$ each are hydrogen.

7. The compound of claim 1 wherein R is methyl, X, $R_1$, $R_2$ and $R_3$ each are hydrogen.

8. The compound of claim 1 wherein $R_2$ and $R_3$ both are lower alkyl and wherein X, R and $R_1$ each are hydrogen.

9. The compound of claim 8 wherein $R_2$ is methyl and $R_3$ is ethyl.

10. The compound of claim 8 wherein $R_2$ is methy' ıd $R_3$ is n-propyl.

11. The compound of claim 8 wherein $R_2$ and $R_3$ both are methyl.

12. The compound of claim 1 wherein X represents methoxy groups in the 3-, 4- and 5-positions and wherein R, $R_1$, $R_2$ and $R_3$ each are hydrogen.

No references cited.

ALEX MAZEL, Primary Examiner

R. V. RUSH, Assistant Examiner

U.S. Cl. X.R.
424—272